Jan. 31, 1956 R. H. COWLES 2,733,108
CUSHIONED HINGE BEARING
Filed March 23, 1953

INVENTOR
Raymond H. Cowles
BY Evans + McCoy
ATTORNEYS

United States Patent Office 2,733,108
Patented Jan. 31, 1956

2,733,108

CUSHIONED HINGE BEARING

Raymond H. Cowles, Wabash, Ind., assignor to The General Tire and Rubber Company, Akron, Ohio, a corporation of Ohio Application March 23, 1953, Serial No. 343,983

6 Claims. (Cl. 308—184)

This invention relates to hinge bearings and more particularly to yieldably mounted bearings for the individually spaced pivot pins of a hinge connection such as the connection between an aileron and an airplane wing. In hinge connections employing spaced pivots some misalignment of the pivots is unavoidable and, in order to eliminate objectionable play in the individual bearings, the present invention provides a yieldable mounting for the individual bearings which will permit them to have the slight independent movements necessary to compensate for such misalignments.

The bearing of the present invention includes a rigid adapter sleeve within which the bearing is mounted and an annular cushion of elastic material such as rubber confined between the bearing and the adapter sleeve in such manner that, when the hinge connection is assembled, the bearings may be supported in positions slightly displaced radially or angularly or both from positions coaxial with the adapter sleeves without imposing an objectionable resistance to pivotal movement and without materially impairing the ability of the cushions to absorb radial shocks.

Aileron hinges are subjected to heavy radial thrusts and the use of rolling bearings is desirable because such bearings are better adapted to withstand shocks and overloads. In an aileron hinge connection employing spaced pivots that connect hinge brackets attached to the aileron and to the wing, an alinement of pivot pins and bearings sufficiently precise to permit the use of conventional rolling bearings is not readily obtainable. Since the present invention provides yieldable supports for the bearings within the adapter sleeves, each bearing can assume a position eccentric to and/or at a slight inclination to the sleeve axis, so that rolling bearings can readily be assembled in the spaced pivots of the hinge connection.

In order to enable the bearing to effectively cushion the severe radial thrusts to which it may be subjected and to restrict the relative movements of the hinge members, the rubber filled recess between the adapter sleeve and the outer race ring of the bearing is so formed that end flow of the rubber under radial pressure is impeded and, in order to lessen the resistance of the stiff cushion to angular movements of the bearing within the adapter sleeve, the recess is so formed that resistance to angular movements of the bearing is not excessive.

To provide resistance to end flow of the rubber in the cushioning annulus, the exterior face of the adapter ring and the exterior surface of the outer race ring of the bearing, which are the rubber confining surfaces, are wave-like or corrugated in transverse section, being provided with alternate ridges and troughs that are parallel and circumferential.

To lessen the resistance to angular movements of the bearing, the internal surface of the adapter sleeve is made generally concave in transverse section and the exterior surface of the outer bearing race ring is made generally convex in transverse section so that the cushioning annulus is of the greatest diameter in the median plane of the bearing and tapers toward both ends of the bearing. The troughs of the adapter sleeve overlie the ridges of the outer bearing race ring, and the opposed surfaces of the adapter sleeve and the space between the adapter sleeve and race ring measured on radii of the sleeve axis is uniform. By reason of the transverse curvature of the elastic bushing, the resistance of the elastic bushing to angular movements of the bearing within the adapter sleeve is lessened and the radial cushioning action of the bushing is not materially impaired by angular misalinement of the bearing.

Reference should be had to the accompanying drawings forming a part of this specification in which.

Figure 1:
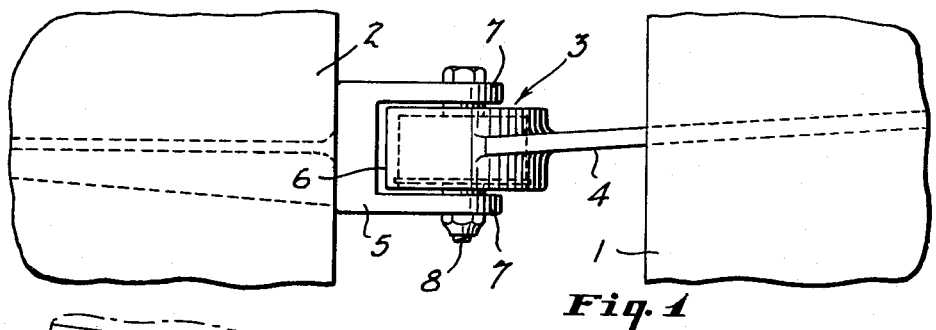
Figure 1 is a plan view of one of the pairs of pivoted brackets of an aileron hinge connection.
Figure 2:
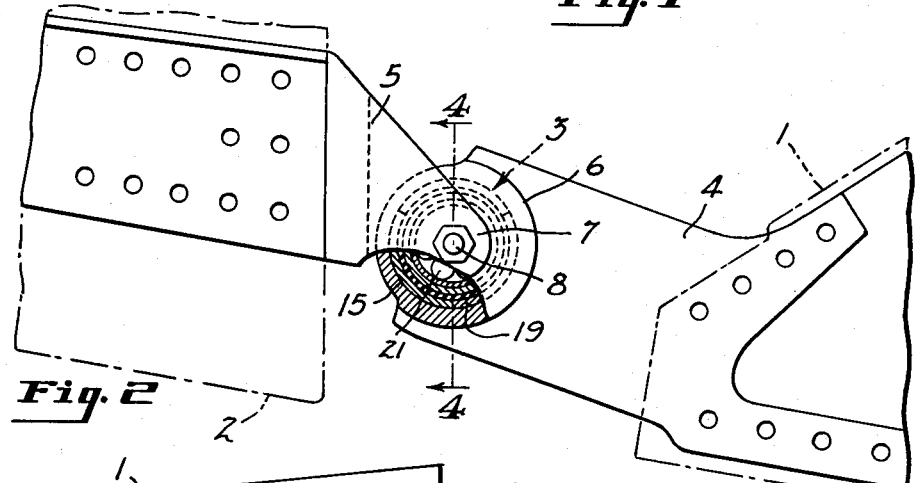
Fig. 2 is a side elevation of the pivoted brackets shown in Fig. 1.
Figure 3:
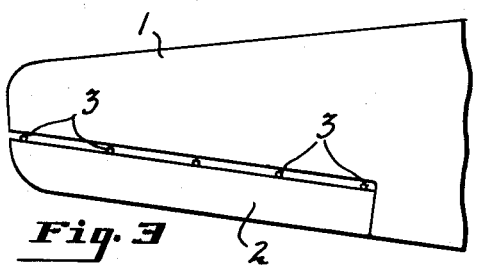
Fig. 3 is a fragmentary plan view of an airplane wing and aileron showing the alined pivots connecting the aileron to the wing.
Figure 4:
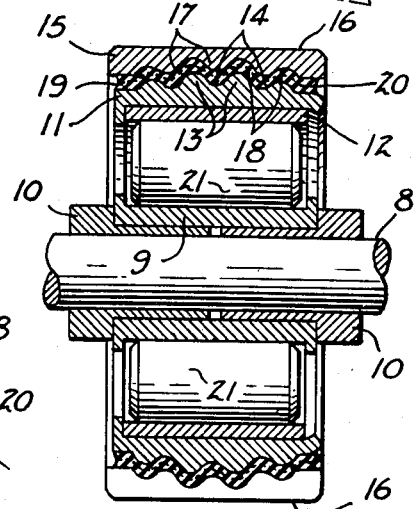
Fig. 4 is a section through the bearing taken on the line indicated at 4—4 in Fig. 2.

In the accompanying drawings the invention is shown applied to the hinge connection between an airplane wing 1 and an aileron 2, the aileron 2 being connected to the wing 1 by a series of spaced alined pivots 3. As shown in Figs. 1 and 2, each pivot connects a bracket 4 attached to the wing 1 to a bracket 5 attached to the aileron 2. The bracket 4 is provided with a bearing socket 6 at its outer end. The bracket 5 is provided with spaced arms 7 that straddle the socket 6. A pivot pin 8 extends through the bearing socket and is supported at its ends in the arms 7. The socket 6 receives a bearing for the pivot pin 8 and this bearing is preferably a rolling bearing that has an inner race ring 9 that fits upon flanged bushings 10 that receive the pivot pin 8 and that serve to position the race ring 9 between the arms 7 of the bracket 5. The bearing has an outer race ring 11 which may be provided with a hardened steel liner 12. The exterior surface of the race ring 11 is wave-like in transverse section, being provided with parallel circumferential ridges 13 and intermediate circumferential troughs 14. The wave-like external surface of the ring is transversely convex, tapering from adjacent the median plane of the ring toward opposite ends thereof.

Surrounding the ring 11 and spaced radially therefrom, there is an adapter sleeve 15 that has an external face 16 adapted to fit within the socket 6 of the bracket 4. The internal peripheral face of the adapter sleeve is transversely concave and wave-like in transverse section, being provided with circumferential ridges 17 and intermediate troughs 18. The ridges and troughs of both the ring and the sleeve are preferably of substantially the same width and depth, and the troughs of the internal face of the adapter sleeve overlie the ridges of the external face of the race ring 11. The internal peripheral face of the adapter sleeve is concentric with the external peripheral face of the race ring 11 and the wave-like surfaces are so formed that the distance between the faces measured on any radius perpendicular to the axis of the bearing is substantially the same.

A rubber bushing 19 is interposed between the race ring 11 and the sleeve 15, and in some instances it may be desirable to provide the rubber bushing with a fabric reinforcement 20 which provides additional resistance to flow of rubber endwise of the bushing. The wave-like contour of the elastic rubber bushing, together with the transverse curvature of the annular space between the race ring and adapter sleeve provides lateral yieldability which permits the bearing to assume positions at a small inclination to the axis of the adapter sleeve without materially reducing the effectiveness of the radial cushioning action of the bushing.

In order to facilitate the assembly of the adapter sleeve on the bearing, the adapter sleeve 15 is preferably made up of a plurality of arcuate sections that abut end to end. The rubber bushing 19 is preferably bonded to the race ring 11 and the sleeve 15 and this may be accomplished by covering the external periphery of the ring with a sheet of unvulcanized rubber and then clamping the sleeve sections upon the exterior of the rubber sleeve, causing the rubber to fill the space between the adapter sleeve and race ring, after which the rubber is vulcanized and bonded to the ring and sleeve.

The rolling bearing may be assembled within the ring 11 after the ring 11 has been bonded to the rubber bushing 19 by inserting the liner 12 within the body of the ring 11 and securing the same in place by upsetting an edge of the ring 11. Rollers 21 may be interposed between the liner 12 and inner race ring 9 and the flanged bushings 10 and pivot pin 8 may be readily assembled within the inner race ring.

Figure 5:
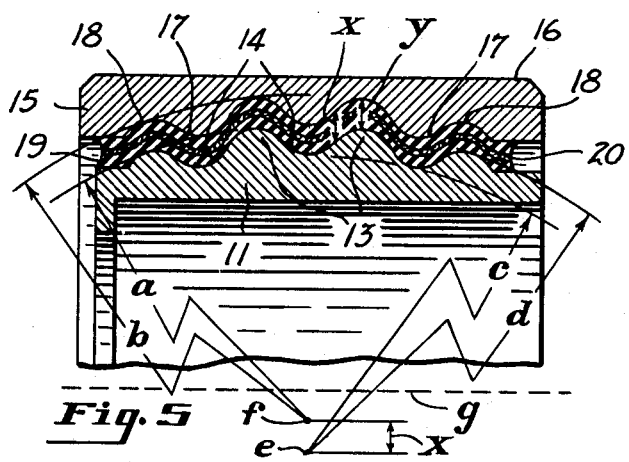
Fig. 5 is a fragmentary section through the outer bearing race ring, adapter ring and the rubber bushing on a scale larger than shown in Fig. 4.

Referring to Fig. 5 of the drawings, it will be seen that the internal peripheral face of the adapter sleeve 15 has its wave-like surface lying between two concentric circles having radii $a$ and $b$ and a common center $f$ in the plane of the section shown in Fig. 5. The outer circle having a radius $b$ is tangent to the rounded troughs 18 and the inner circle having a radius $d$ is tangent to the rounded ridges 17. The wave-like surface of the ring 11 lies between concentric circles having radii $c$ and $d$ and a common center $e$. The inner circle whose radius is $c$ is tangent to the troughs 14, and the outer circle of radius $e$ is tangent to the ridges 13. The centers $e$ and $f$ lie in the median plane of the ring 11 and sleeve 15 and are offset radially with respect to each other and with respect to the axis $g$ of the bearing. The radius $a$ is equal to the radius $c$, the radius $b$ is equal to the radius $d$ and the centers $e$ and $f$ are in the median plane of the bearing, so that the distance between the circles measured on any line parallel to the median plane is equal to the distance $e-f$. Since the internal face of the adapter ring and the external face of the race ring are concentric surfaces of revolution and, since ridges and troughs of the ring and sleeve are substantially the same width and depth, the distance between the exterior surface of the ring 11 and interior surface of the sleeve 15 is substantially the same on any radius perpendicular to the bearing axis, as indicated at $x$ and $y$ in Fig. 5.

It is to be understood that in accordance with the provisions of the patent statutes, variations and modifications of the specific devices herein shown and described may be made without departing from the spirit of the invention.

What I claim is:

1. A cushioned pivot bearing comprising a rolling bearing having an outer race ring provided with an external transversely convex peripheral face that has a wave-like contour in transverse section providing parallel transverse circumferential ridges and troughs, said wave-like contour in any plane radial to said ring lying between concentric circles in the plane that have their centers near the ring axis and near the median plane of the ring and that are tangent to the tips of the ridges and the bottoms of the troughs, an adapter sleeve surrounding and spaced radially from said ring, said sleeve having an internal transversely concave peripheral face with a wave-like contour providing ridges and troughs of substantially the same width and depth as the ridges and troughs of said external ring face, said sleeve being disposed with its troughs overlying the ridges of the inner ring, and an annular body of elastic rubber confined between said peripheral faces.

2. A cushioned pivot bearing comprising a rolling bearing havng an outer race ring provided with an external transversely convex peripheral face that has a wave-like contour in transverse section providing parallel transverse circumferential ridges and troughs, said wave-like contour in any plane radial to said ring lying between concentric circles in the plane that have their centers near the ring axis and near the median plane of the ring and that are tangent to the tips of the ridges and the bottoms of the troughs, an adapter sleeve surrounding and spaced radially from said ring, said sleeve having an internal transversely concave peripheral face with a wave-like contour providing ridges and troughs of substantially the same width and depth as the ridges and troughs of said external ring face, said sleeve being disposed with its troughs overlying the ridges of the inner ring, the wave-like contour of said internal face lying between concentric circles in radial planes of the same radii as the concentric circles bounding the ridges and troughs of said ring, the centers of the concentric circles bounding the ridges and troughs of said internal face being offset in the median plane from the centers of the first mentioned concentric circles a distance equal to the radial spacing of said peripheral faces, and an annular body of elastic rubber confined between said peripheral faces.

3. In an airplane wing having an aileron connected thereto by a series of spaced alined pivots, a series of spaced alined cushioned bearings for said pivots, each bearing comprising an annular bearing member provided with a circumferentially corrugated transversely convex external peripheral face, said corrugated face having a transverse curvature slightly less than its circumferential curvature, an outer sleeve member surrounding and spaced radially from said bearing member, said sleeve member having a circumferentially corrugated internal transversely concave peripheral face similar to said external face, and an annular body of elastic rubber confined between said peripheral faces.

4. A cushioned pivot bearing comprising a roller bearing having an outer race ring provided with an external transversely convex peripheral face that has circular circumferential ridges and circular circumferential troughs between the ridges, an adapter sleeve surrounding and spaced radially from said ring, said sleeve having an internal transversely concave peripheral face that has circular circumferential ridges and troughs overlying the circular troughs and ridges of said race ring face, the ridges and troughs of both said faces increasing in diameter toward the median plane of the bearing, said adapter sleeve comprising arcuate sections abutting end to end, and an annular body of elastic rubber confined between said sleeve and said ring and bonded to said peripheral face.

5. A cushioned pivot bearing comprising a rolling bearing having an outer race ring provided with an external transversely convex peripheral face that has circular circumferential ridges and circular circumferential troughs between the ridges, an adapter sleeve surrounding and spaced radially from said ring, said sleeve having an internal transversely concave peripheral face that has circular circumferential ridges and troughs overlying the circular troughs ad ridges of said race ring face, the ridges and troughs of both said faces increasing in diameter toward the median plane of the bearing, said adapter sleeve being composed of arcuate sections abutting end to end, an annular body of elastic rubber confined between said sleeve and said ring, and a reinforcing fabric confined in said rubber between said sleeve and said ring, said arcuate sections facilitating assembly of the fabric-reinforced rubber body between the corrugated faces of said sleeve and said ring.

6. A cushioned pivot bearing for an aileron of an airplane wing comprising an annular bearing member provided with a circumferentially corrugated transversely convex external peripheral face, an outer sleeve member surrounding and spaced radially from said bearing member, said sleeve member having a circumferentially corrugated internal transversely concave peripheral face, said faces having a generally circular transverse curvature, and an annular body of elastic rubber confined between said peripheral faces.

References Cited in the file of this patent

UNITED STATES PATENTS

| | | |
|---|---|---|
| 1,725,523 | Keys | Aug. 20, 1929 |
| 1,851,561 | Baninger | Mar. 29, 1932 |
| 2,073,419 | Houdaille | Mar. 9, 1937 |
| 2,231,037 | Taylor | Feb. 11, 1941 |
| 2,674,505 | Pfenninger | Apr. 6, 1954 |

FOREIGN PATENTS

| | | |
|---|---|---|
| 618,628 | France | July 6, 1926 |